(12) United States Patent
Au et al.

(10) Patent No.: US 11,259,246 B2
(45) Date of Patent: *Feb. 22, 2022

(54) SYSTEM AND METHOD FOR ALWAYS ON CONNECTIONS IN WIRELESS COMMUNICATIONS SYSTEM

(71) Applicant: Huawei Technologies Co., Ltd., Shenzhen (CN)

(72) Inventors: Kelvin Kar Kin Au, Kanata (CA); Liqing Zhang, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,717

(22) Filed: Oct. 5, 2018

(65) Prior Publication Data

US 2019/0037501 A1    Jan. 31, 2019

Related U.S. Application Data

(63) Continuation of application No. 14/150,539, filed on Jan. 8, 2014.

(51) Int. Cl.
*G08C 17/00* (2006.01)
*H04W 52/02* (2009.01)
*H04W 88/02* (2009.01)

(52) U.S. Cl.
CPC ... *H04W 52/0251* (2013.01); *H04W 52/0212* (2013.01); *H04W 52/0258* (2013.01); *H04W 88/02* (2013.01); *Y02D 30/70* (2020.08)

(58) Field of Classification Search
USPC ....... 370/230, 252, 311, 318, 328, 329, 330, 370/331
See application file for complete search history.

(56) References Cited

U.S. PATENT DOCUMENTS

| 7,558,861 | B1 | 7/2009 | Qidwai et al. |
| 7,945,281 | B1 | 5/2011 | Sigg et al. |
| 8,320,929 | B2 | 11/2012 | Torsner et al. |

(Continued)

FOREIGN PATENT DOCUMENTS

| CN | 101854294 A | 10/2010 |
| CN | 101938810 A | 1/2011 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 9)," 3GPP TS 36.331 V9.3.0, Technical Specification, Jun. 2010, 250 pages.

(Continued)

*Primary Examiner* — Nguyen H Ngo
(74) *Attorney, Agent, or Firm* — Slater Matsil, LLP

(57) ABSTRACT

A method for operating a user equipment (UE) includes determining a first operating state in accordance with a first message traffic generated by a non-session based application executing in the UE, setting a state machine in the UE to the first operating state, and transmitting a first message in accordance with the state machine.

17 Claims, 12 Drawing Sheets

(56) References Cited

U.S. PATENT DOCUMENTS

| | | | |
|---|---|---|---|
| 8,493,904 B2* | 7/2013 | Kang | H04W 72/042 370/313 |
| 9,145,902 B2 | 10/2015 | Talley et al. | |
| 9,154,902 B1 | 10/2015 | Talley et al. | |
| 9,258,729 B1* | 2/2016 | Oroskar | H04W 28/0205 |
| 11,012,940 B2* | 5/2021 | Au | H04W 52/0258 |
| 11,019,570 B2* | 5/2021 | Au | H04W 52/0251 |
| 2003/0099214 A1 | 5/2003 | Schmidt et al. | |
| 2004/0246930 A1 | 12/2004 | Fong et al. | |
| 2005/0054389 A1 | 3/2005 | Lee et al. | |
| 2005/0122945 A1 | 6/2005 | Hurtta | |
| 2005/0266846 A1 | 12/2005 | Kim | |
| 2006/0234706 A1 | 10/2006 | Wallentin | |
| 2007/0254679 A1 | 11/2007 | Montojo et al. | |
| 2008/0019306 A1 | 1/2008 | Damnjanovic | |
| 2008/0080432 A1 | 4/2008 | Lu et al. | |
| 2008/0144574 A1 | 6/2008 | Jayapalan et al. | |
| 2008/0253312 A1 | 10/2008 | Park | |
| 2008/0273514 A1 | 11/2008 | Kuo | |
| 2008/0307081 A1 | 12/2008 | Dobbins et al. | |
| 2009/0029706 A1* | 1/2009 | Prakash | H04W 36/0079 455/436 |
| 2009/0109907 A1* | 4/2009 | Tsai | H04L 5/0037 370/329 |
| 2009/0109912 A1* | 4/2009 | DiGirolamo | H04L 5/0053 370/329 |
| 2009/0109937 A1 | 4/2009 | Cave et al. | |
| 2009/0141661 A1* | 6/2009 | Li | H04W 76/27 370/311 |
| 2009/0163199 A1 | 6/2009 | Kazmi et al. | |
| 2009/0280839 A1 | 11/2009 | Farnsworth et al. | |
| 2009/0323541 A1 | 12/2009 | Sagfors et al. | |
| 2010/0042856 A1 | 2/2010 | Tsai et al. | |
| 2010/0061247 A1 | 3/2010 | He | |
| 2010/0061354 A1* | 3/2010 | Maheshwari | H04W 68/02 370/338 |
| 2010/0081454 A1 | 4/2010 | Wang et al. | |
| 2010/0091692 A1 | 4/2010 | Kashiwase | |
| 2010/0118811 A1 | 5/2010 | Lee et al. | |
| 2010/0172277 A1 | 7/2010 | Kashiwase | |
| 2010/0202415 A1 | 8/2010 | Ansari et al. | |
| 2010/0220623 A1* | 9/2010 | Cave | H04L 1/0007 370/252 |
| 2010/0246591 A1 | 9/2010 | Gobriel et al. | |
| 2010/0254386 A1 | 10/2010 | Salinger et al. | |
| 2010/0284292 A1 | 11/2010 | You et al. | |
| 2010/0329193 A1 | 12/2010 | Bienas et al. | |
| 2011/0039536 A1 | 2/2011 | Lee et al. | |
| 2011/0194593 A1 | 8/2011 | Geirhofer et al. | |
| 2011/0238825 A1 | 9/2011 | Maffione et al. | |
| 2011/0243050 A1 | 10/2011 | Yanover | |
| 2011/0292895 A1 | 12/2011 | Wager et al. | |
| 2011/0312347 A1 | 12/2011 | Dinan | |
| 2012/0069805 A1 | 3/2012 | Feuersanger et al. | |
| 2012/0069827 A1 | 3/2012 | Lee et al. | |
| 2012/0173901 A1 | 7/2012 | Soliman et al. | |
| 2012/0201378 A1 | 8/2012 | Nabeel et al. | |
| 2012/0213137 A1 | 8/2012 | Jeong et al. | |
| 2012/0250521 A1 | 10/2012 | Marinier et al. | |
| 2012/0250578 A1 | 10/2012 | Pani et al. | |
| 2013/0070700 A1 | 3/2013 | Chang | |
| 2013/0109368 A1* | 5/2013 | Hellander | H04W 76/27 455/418 |
| 2013/0114473 A1* | 5/2013 | Awoniyi | H04W 24/10 370/280 |
| 2013/0114566 A1 | 5/2013 | Awoniyi et al. | |
| 2013/0121172 A1 | 5/2013 | Cheng et al. | |
| 2013/0122918 A1 | 5/2013 | Boley et al. | |
| 2013/0136047 A1 | 5/2013 | Zhang et al. | |
| 2013/0258839 A1 | 10/2013 | Wang et al. | |
| 2013/0294307 A1 | 11/2013 | Johansson et al. | |
| 2013/0301591 A1 | 11/2013 | Meyer et al. | |
| 2014/0086160 A1 | 3/2014 | Kim et al. | |
| 2014/0115125 A1 | 4/2014 | Chen | |
| 2014/0115394 A1 | 4/2014 | Fattah | |
| 2014/0119195 A1 | 5/2014 | Tofighbakhsh et al. | |
| 2014/0120935 A1* | 5/2014 | Li | H04W 56/0045 455/452.1 |
| 2014/0192767 A1 | 7/2014 | Au et al. | |
| 2015/0181481 A1 | 6/2015 | Masini et al. | |
| 2015/0181571 A1 | 6/2015 | Park et al. | |
| 2015/0195788 A1* | 7/2015 | Au | H04W 52/0251 370/311 |
| 2015/0341857 A1 | 11/2015 | Uchino et al. | |
| 2016/0057797 A1 | 2/2016 | Bangolae et al. | |
| 2019/0045448 A1 | 2/2019 | Au et al. | |

FOREIGN PATENT DOCUMENTS

| | | |
|---|---|---|
| CN | 102292933 A | 12/2011 |
| CN | 102869083 A | 1/2013 |
| CN | 103229585 A | 7/2013 |
| CN | 103430602 A | 12/2013 |
| CN | 104012144 A | 8/2014 |
| CN | 104221444 A | 12/2014 |
| EP | 2579671 A2 | 4/2013 |
| RU | 2398354 C1 | 8/2010 |
| WO | 2003049487 A3 | 6/2003 |
| WO | 2010057540 A1 | 5/2010 |
| WO | 2013097452 A1 | 7/2013 |
| WO | 2013112733 A1 | 8/2013 |

OTHER PUBLICATIONS

Ericsson, "Enhanced Paging Procedure," 3GPP TSG RAN WG2 #57, Tdoc R2-070586, St. Louis, Missouri, USA, Feb. 12-16, 2007, 6 pages.

* cited by examiner

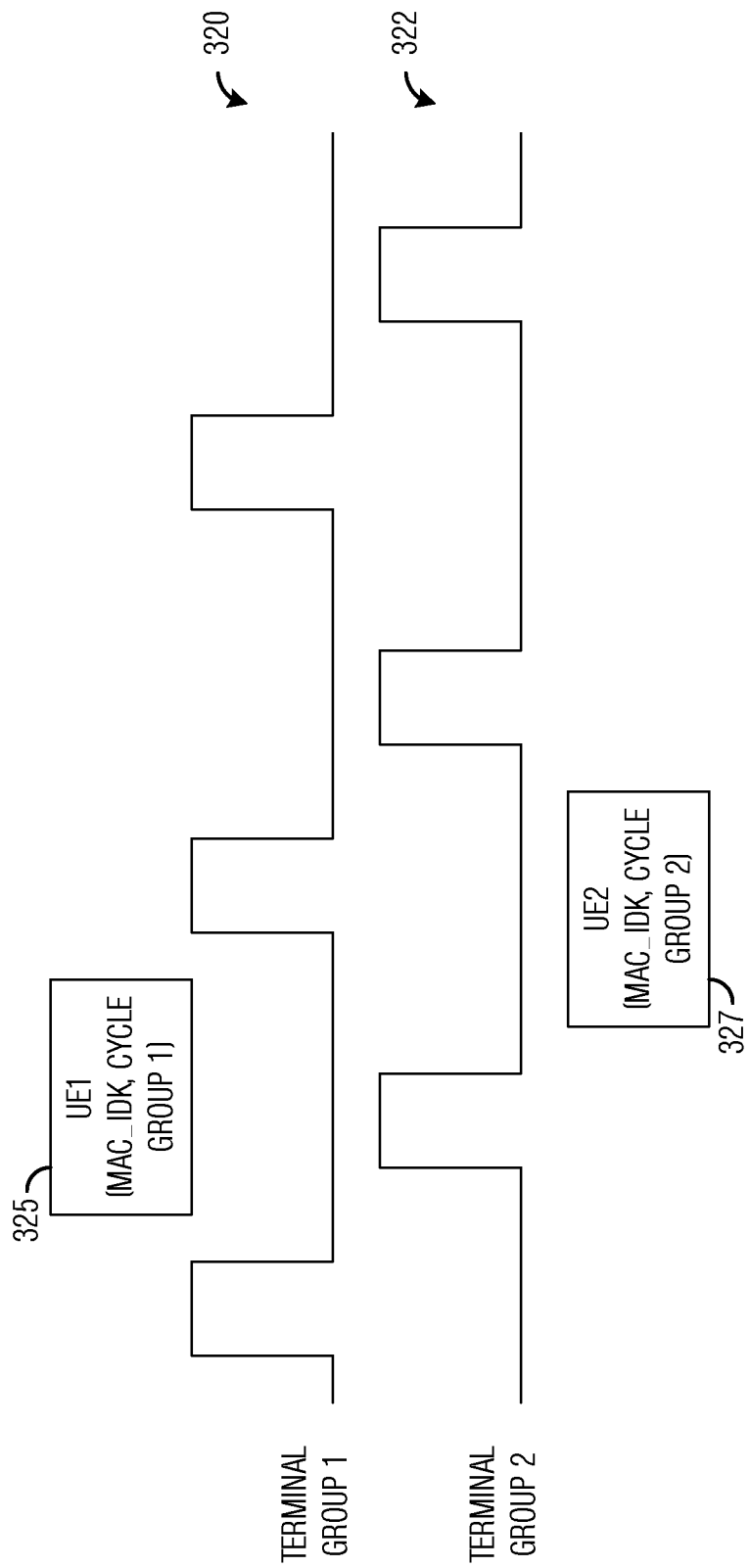

SYSTEM AND METHOD FOR ALWAYS ON CONNECTIONS IN WIRELESS COMMUNICATIONS SYSTEM

CROSS-REFERENCE TO RELATED APPLICATIONS

This application is a continuation of U.S. patent application Ser. No. 14/150,539, filed on Jan. 8, 2014, which application is hereby incorporated herein by reference.

TECHNICAL FIELD

The present disclosure relates generally to digital communications, and more particularly to a system and method for always on connections in wireless communications systems.

BACKGROUND

As User Equipments (UE) become more advanced, they are becoming more connected to Evolved NodeBs (eNB)s with different applications running in the foreground (referred to as a foreground application) and the background (referred to as a background application). UEs may also be commonly referred to as terminals, subscribers, users, mobile stations, mobiles, and the like. eNBs may also be commonly referred to as NodeBs, base stations, controllers, communications controllers, access points, and the like.

Foreground applications (and associated message traffic—"foreground traffic") include video streaming, web browsing, file transfer, games, and the like. Background applications (and associated message traffic—"background traffic") include keep alive messages generated by a mobile operating system or instant messaging, reports generated by sensors and/or smart meters, and the like. Providing always connectivity (maintaining an existing connection to enable low latency communications rather than permitting an existing connection to end and re-establishing another connection when needed) while conserving energy (to maximize battery life, for example) is a big challenge.

SUMMARY

Example embodiments of the present disclosure which provide a system and method for always on connections in wireless communications systems.

In accordance with an example embodiment of the present disclosure, a method for operating a UE includes determining a first operating state in accordance with a first message traffic generated by a non-session based application executing in the UE, setting a state machine in the UE to the first operating state, and transmitting a first message in accordance with the state machine.

In accordance with another example embodiment of the present disclosure, a UE includes a processor, and a transmitter operatively coupled to the processor. The processor is configured to determine a first operating state in accordance with a first message traffic generated by a non-session based application executing in the UE, and to set a state machine in the UE to the first operating state. The transmitter is configured to transmit a first message in accordance with the state machine.

One advantage of an embodiment is that for UE operating in an ECO state, always on connections may be maintained while energy consumption is minimized.

A further advantage of an embodiment is that communications overhead and latency are minimized since UEs operating in the ECO state do not need to switch to an active state to support transmissions for background applications. Eliminating the need to switch states helps to reduce messaging overhead, which reduces communications overhead and increases communications system efficiency.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 3b illustrates a second example UE identifier that is a combination of MAC identifier and sleep cycle group information according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to always on connections in wireless communications systems. For example, a UE determines a first operating state in accordance with a first message traffic generated by a non-session based application executing in the UE, sets a state machine in the UE to the first operating state, and transmits a message in accordance with the state machine. As another example, an eNB receives information about a first message traffic generated by a non-session based application executing in a user equipment (UE), determines an operating state for the UE in accordance with the information, and transmits an indication of the operating state to the UE.

The present disclosure will be described with respect to example embodiments in a specific context, namely communications systems that use support always on connections. The disclosure may be applied to standards compliant communications systems, such as those that are compliant with Third Generation Partnership Project (3GPP), IEEE 802.11, and the like, technical standards, and non-standards compliant communications systems, that support always on connections.

Figure 1:
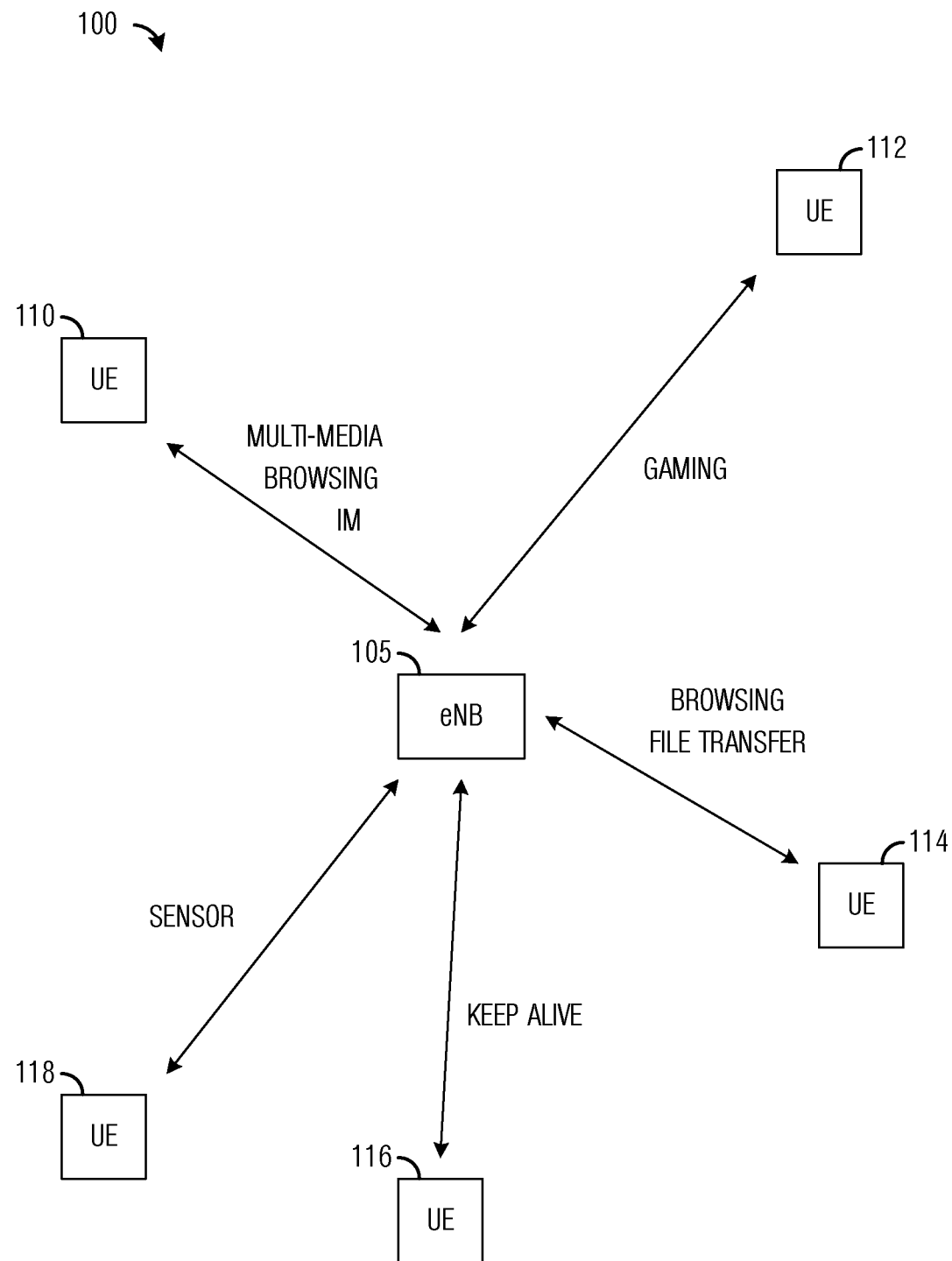
FIG. 1 illustrates an example communications system according to example embodiments described herein.

FIG. 1 illustrates an example communications system 100. Communications system 100 includes an eNB 105 serving a plurality of UEs, including UE 110, UE 112, UE 114, UE 116, and UE 118. As discussed previously, as UEs become more advanced, they are capable of running a wider range of applications. The applications may be classified as either session based applications or non-session based applications. Session based applications (which may include video streaming, web browsing, file transfer, games, and the like, applications) are generally applications that utilize a series of data exchanges and have intolerance to large latencies, generate a lot of message traffic, have large data bandwidth requirements, and the like. Non-session based applications (which may include keep alive messages generated by a mobile operating system or instant messaging, reports generated by sensors and/or smart meters, and the like, applications) are typically applications that utilize short data exchanges and some can tolerate large latencies, generate a small amount of message traffic, have small data bandwidth requirements, and the like. However, some non-session based applications may not be able to tolerate large latencies, such as security sensors, health sensors, and the like.

As an illustrative example, UE 110 is running a multimedia streaming application, a web browser, as well as an instant messaging application, while UE 112 is running a multi-user video game. Similarly, UE 114 is running a web browser while performing a large file transfer, UE 116 is running an instant messaging application that is not active and is transmitting keep alive messages to maintain connectivity, while UE 118 is a sensor that reports on occasion.

While it is understood that communications systems may employ multiple eNBs capable of communicating with a number of UEs, only one eNB, and a number of UEs are illustrated for simplicity.

Typically, terminal connection state machines (or simply state machines) are used in UEs to define characteristics of UEs in terms of network resource usage (e.g., dedicated resources or shared resources), control channel usage, control channel monitoring pattern, and the like. The design of the state machine impacts the power consumption of the UEs, network resources (e.g., physical resources, UE identifier allocation, and the like), data transmission latency, control plane signaling overhead, and the like.

As an illustrative example, if a state machine includes two states: CONNECTED and IDLE with the IDLE state not allowing the UE to transmit, then a UE executing non-session based applications transitions to the CONNECTED state prior to transmitting or receiving transmissions (which, due to the nature of non-session based applications, occurs infrequently). The state transition generally requires the exchange of multiple messages between the UE and its eNB, which incurs significant communications overhead and communications latency, especially when considering that the UE may be transmitting or receiving messages that are only a few bytes long (or less).

According to an example embodiment, a state machine may be designed to allow UEs executing non-session based applications to communicate using background messages without having to change states from a first state that permits substantial energy consumption savings to a second state that results in greater energy consumption but generally has no restrictions on how the UE communicates.

Figure 2:
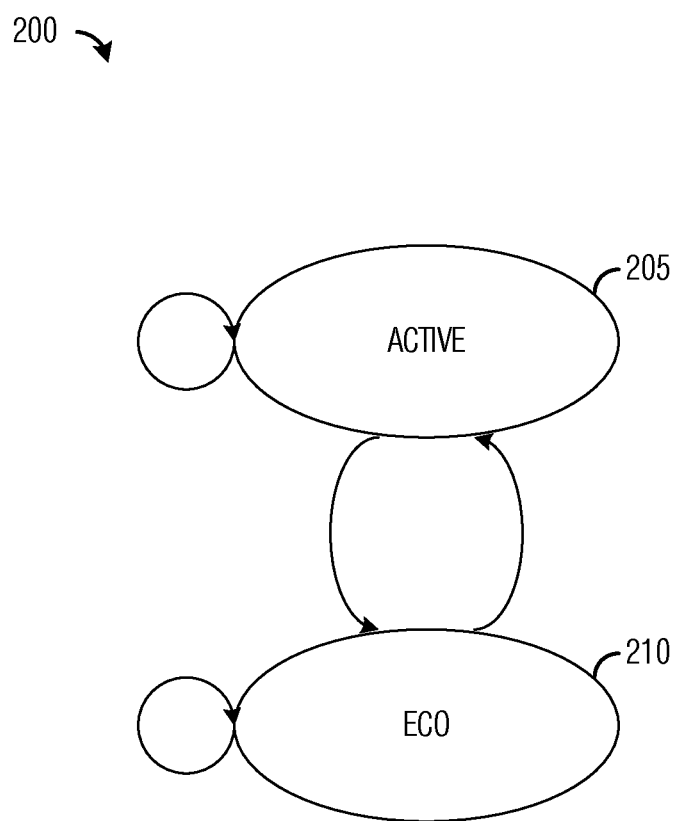
FIG. 2 illustrates a diagram of an example state machine according to example embodiments described herein.

FIG. 2 illustrates a diagram of an example state machine 200. State machine 200 includes two states: ACTIVE state 205 and ECO state 210. ACTIVE state 205 may be designed for a UE that transmitting and/or receiving message traffic for session based applications, e.g., interactive and/or foreground (e.g., web browsing, file transfer, instant messaging, chatting, gaming, and the like). ACTIVE state 205 may support data transmission and reception with active connection management (which means that there is a need for short-term link connection reports by the UE and need for dynamic resource allocation requests and grants from an eNB), and employs scheduled, semi-persistent and/or persistent scheduling and grant-free transmission mechanisms. ECO state 210 may be designed for a UE that is in a power saving state with some transmitting and/or receiving of message traffic for non-session based applications. ECO state 210 may support data transmission and reception with a light connection management mechanism (which typically means that there is not a need for short-term link connection reports by the UE and no need for dynamic resource allocation requests and grants from an eNB), and employs a semi-persistent and/or persistent scheduling with semi-static link adaptation and/or a grant-free transmission mechanism. Furthermore, ECO state 210 allows for the maintenance of an identifier for a UE to facilitate data transmission and/or reception while in ECO state 210. ECO state 210 also permits fast transitions to ACTIVE state 205 using a dedicated connection signature.

State machine 200 allows state transitions from ACTIVE state 205 to ECO state 210, from ECO state 210 to ACTIVE state 205, from ACTIVE state 205 to ACTIVE state 205, and from ECO state 210 to ECO state 210.

A UE that is in ACTIVE state 205 may be assigned a UE-centric identifier (e.g., a media access control (MAC) identifier) based on its dedicated connection signature (DCS) obtained after initial network entry. While in ACTIVE state 205, the UE can transmit and/or receive message traffic using a scheduled grant mechanism (such as in a typical cellular communications system), a semi-persistent and/or persistent mechanism, and/or a grant-free mechanism. A detailed discussion of an example grant-free mechanism is presented in co-assigned U.S. patent application Ser. No. 13/911,716, entitled "System and Method for Small Traffic Transmissions," filed Jun. 6, 2013, which is incorporated herein by reference. A detailed discussion of an example dedicated connection signature is presented in co-assigned U.S. patent application Ser. No. 13/608,653, entitled "System and Method for User Equipment Centric Unified System Access in Virtual Radio Access Network," filed Sep. 10, 2012, which is incorporated herein by reference.

A UE that is ECO state 210 may strive to conserve energy but still is able to transmit and/or receive using the grant-free mechanism and/or a semi-persistent and/or persistent mechanism with semi-static link adaptation for certain types of message traffic (i.e., non-session based traffic). The UE may be assigned a UE-centric identifier (e.g., a MAC identifier) based on its DCS obtained after initial network entry, as in ACTIVE state 205. There may be several possibilities for UE-centric identifier assignment. If the UE-centric identifier space is sufficiently large, a unique identifier may be assigned to the UEs in both ACTIVE state 205 and ECO state 210, meaning that there is a one-to-one mapping between a UE's DCS (which is unique to a UE) and its UE-centric identifier. If there are not a sufficient number of UE-centric identifiers, the UE's identifier may be based on a combination of several values, including a UE-centric identifier.

Figure 3A:
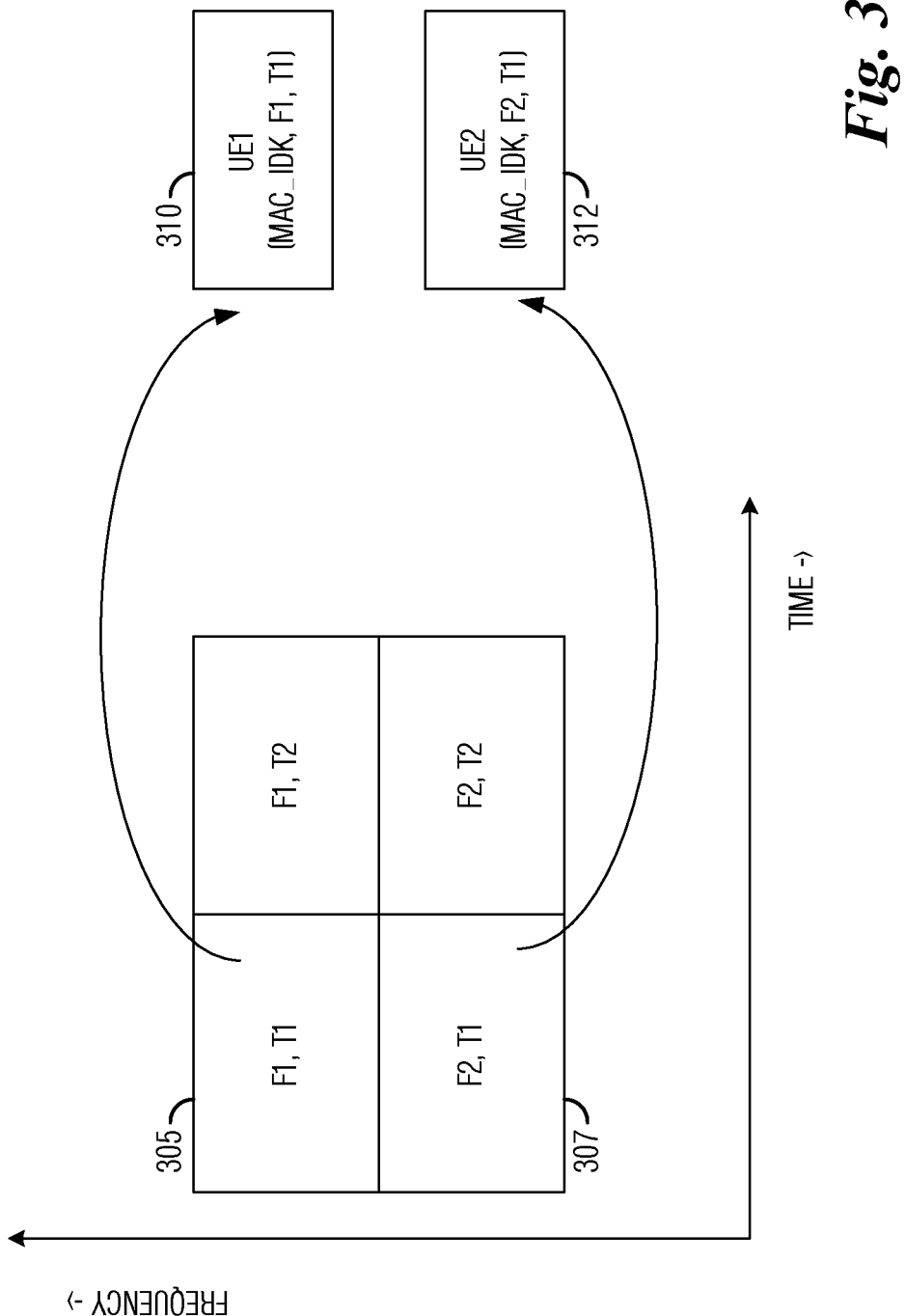
FIG. 3a illustrates a first example UE identifier that is a combination MAC identifier and network resource information according to example embodiments described herein.

FIG. 3a illustrates a first example UE identifier that is a combination MAC identifier and network resource information. The first example UE identifier may be used to identify UEs while they are in an ECO state, such as ECO state 210. An example network resource diagram is shown in FIG. 3a highlighting four network resources identified by their time resource identifier and frequency resource identifier. As an example, network resource 305 is identified by its frequency resource identifier F1 and time resource identifier T1, while network resource 307 is identified by its frequency resource identifier F2 and time resource identifier T1.

According to an illustrative example, the first example UE identifier may be expressed as a combination of a UE's MAC identifier and network resource identifiers. As shown in FIG. 3a, the UE identifier for a first UE assigned network resource 305 is (MAC_IDK, F1, T1) 310 and for a second UE assigned network resource 307 is (MAC_IDK, F2, T1), where MAC_IDK is the MAC identifier assigned to both first UE and second UE for use in the ECO state, e.g. ECO state 210. The combination of the MAC identifier with the network resource identifiers allows the reuse of a MAC identifier with different UEs.

FIG. 3b illustrates a second example UE identifier that is a combination of MAC identifier and sleep cycle group information. The second example UE identifier may be used to identify UEs while they are in an ECO state, such as ECO state 210. A first trace 320 and second trace 322 are shown in FIG. 3b illustrating paging cycle groups for UEs, with high periods representing when UEs in a particular paging cycle group may monitor a paging channel.

According to an illustrative example, the second example UE identifier may be expressed as a combination of a UE's MAC identifier and its sleep cycle group information. As shown in FIG. 3b, the UE identifier for a first UE of a first paging cycle group is (MAC_IDK, cycle group 1) 325 and the UE identifier for a second UE of a second paging cycle group is (MAC_IDK, cycle group 2) 327, where MAC_IDK is the MAC identifier assigned to both first UE and second UE while they were in an ACTIVE state, e.g., ACTIVE state 205.

Referring back now to FIG. 2, UEs in ECO state 210 may receive paging messages transmitted by their respective eNBs on a downlink. Additionally, since the UEs have unique assigned UE identifiers (e.g., MAC identifiers), data transmission and/or reception is possible. However, to enable energy conservation, grant-free transmission of non-session based traffic and/or low-rate traffic is configured.

In general, a UE wakes up from a defined sleep cycle (e.g., as defined by its sleep cycle group) and decodes a data channel for grant-free transmission. The UEs do not monitor a dynamic control channel since there is no scheduled transmission mechanism and therefore, reduce energy consumption.

Figure 3C:
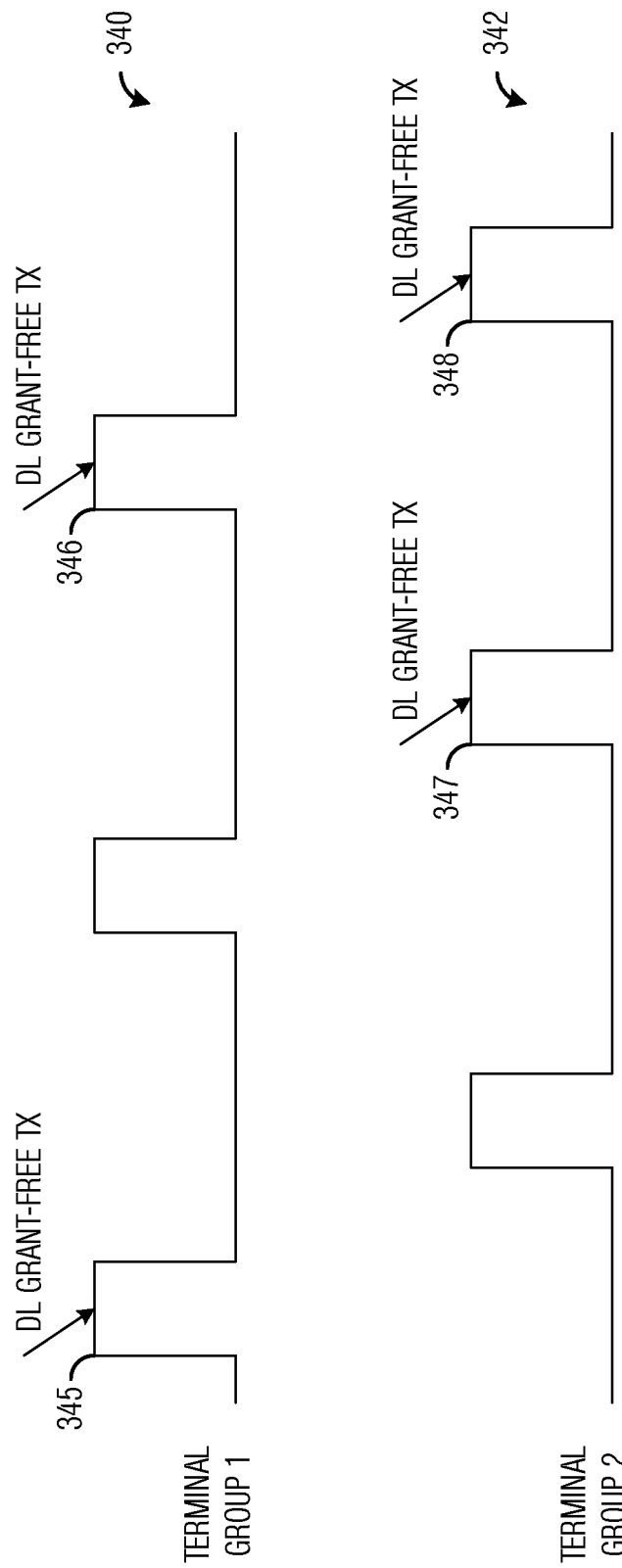
FIG. 3c illustrates a diagram of an example grant-free transmission mechanism for UE in an ECO state according to example embodiments described herein.

FIG. 3c illustrates a diagram of an example grant-free transmission mechanism for UE in an ECO state. A first trace 340 and second trace 342 are shown in FIG. 3c illustrating paging cycle groups for UEs, with high periods representing when UEs in a particular paging cycle group may monitor a data channel. As an example, a first UE that is part of first paging cycle group may wake up at periods 345 and 346 to monitor a data channel for grant-free transmissions, and a second UE that is part of second paging cycle group may wake up at periods 347 and 348 to monitor a data channel for grant-free transmissions.

Generally, the message traffic generated by applications may need to be characterized in order to determine which state a UE may be operating in. As an example, the message traffic generated by an application may be characterized as either session based traffic (implying that a UE executing the application operates in the ACTIVE state) or non-session based traffic (implying that a UE executing the application operates in the ECO state). Furthermore, if the message traffic generated by an application may be characterized as both session based traffic and non-session based traffic (e.g., in a social networking application, session based traffic may be generated by a chat session and non-session based traffic may be generated by a status update operation), then a UE executing such an application may operate in the ACTIVE state in order to support the session based traffic.

Alternatively, instead of characterizing the message traffic generated by the applications, the applications may be characterized. As an example, an application may be characterized as either a session based application or a non-session based application. The characterization of the applications may be used to set a UE's state. As an illustrative example, UEs executing session based applications may be set to operate in the ACTIVE state, while UEs executing non-session based applications may be set to operating in the ECO state. It is noted that if a UE is executing both session based applications and non-session based applications, the UE may be set to operate in the ACTIVE state in order to support the session based applications.

Figure 4:
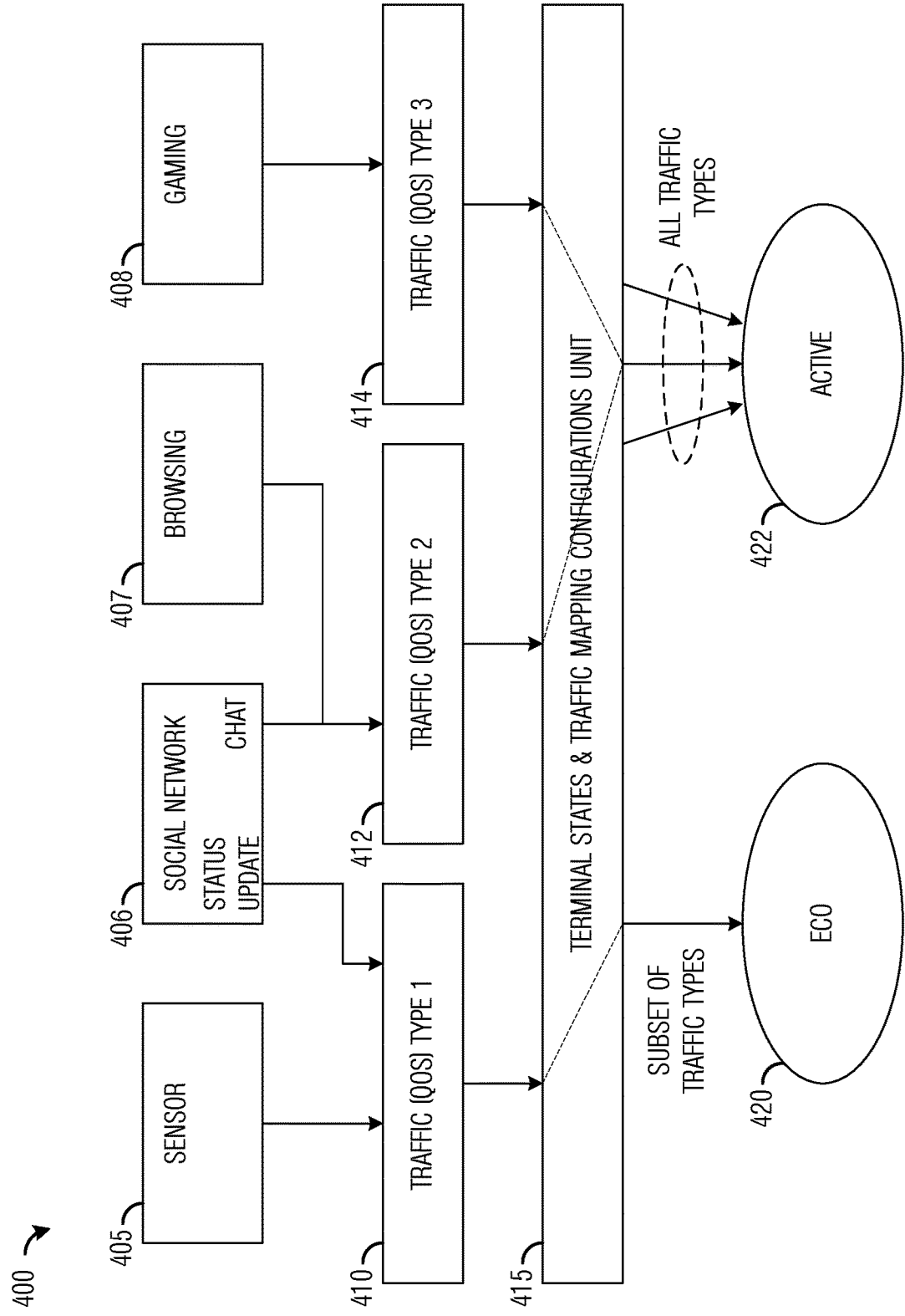
FIG. 4 illustrates a diagram of an example characterization of message traffic generated by applications according to example embodiments described herein.

FIG. 4 illustrates a diagram 400 of an example characterization of message traffic generated by applications. As shown in diagram 400, message traffic generated from a plurality of applications, including (but not limited to) a sensor application 405, a social network application 406, a browsing application 407, and a gaming application 408, may be characterized by examining their quality of service (QoS) requirements, for example. As an illustrative example, message traffic from sensor application 405 may have a first QoS requirement (type 1) 410, as does status update messages from social network application 406. However, chat messages from social network application 406 and messages from browsing application 407 may have a second QoS requirement (type 2) 412. Messages from gaming application 408 may have a third QoS requirement (type 3) 414.

The QoS requirements may be provided to UE states & traffic mapping configurations unit 415 (or simply configurations unit), where traffic mapping configuration information may be used to characterize the message traffic and map the message traffic to ECO state 420, since ACTIVE state 422 is generally capable of supporting all types of traffic. As shown in diagram 400, first QoS requirement message traffic may be mapped to ECO state 420, while second and third QoS requirement message traffic may be supported by ACTIVE state 422.

According to an example embodiment, the traffic mapping configuration information may be generated by an eNB or a network entity tasked with generating the traffic mapping configuration information. According to an alternative example embodiment, the traffic mapping configuration information may be specified by a technical standard or by an operator of the wireless communications system. The traffic mapping configuration information may be based on historical data collected by monitoring applications and the message traffic that they generate, as well as the impact on the wireless communications system, energy consumption of the UEs, and the like.

According to an example embodiment, the traffic mapping configuration information may be provided to the UE. The traffic mapping configuration information may be provided to the UE when it performs initial network entry. The traffic mapping configuration information may be updated. The updates may be made to meet changing operating conditions. As an example, if the power consumption of the UEs is too high, the characterization of some of message traffic (or applications) may be changed from session based to non-session based, and vice versa. The updates may be made at specified intervals. The updated traffic mapping information may be provided to the UE by broadcast message or a multicast higher layer signaling (such as radio resource control (RRC)) message.

Figure 5:
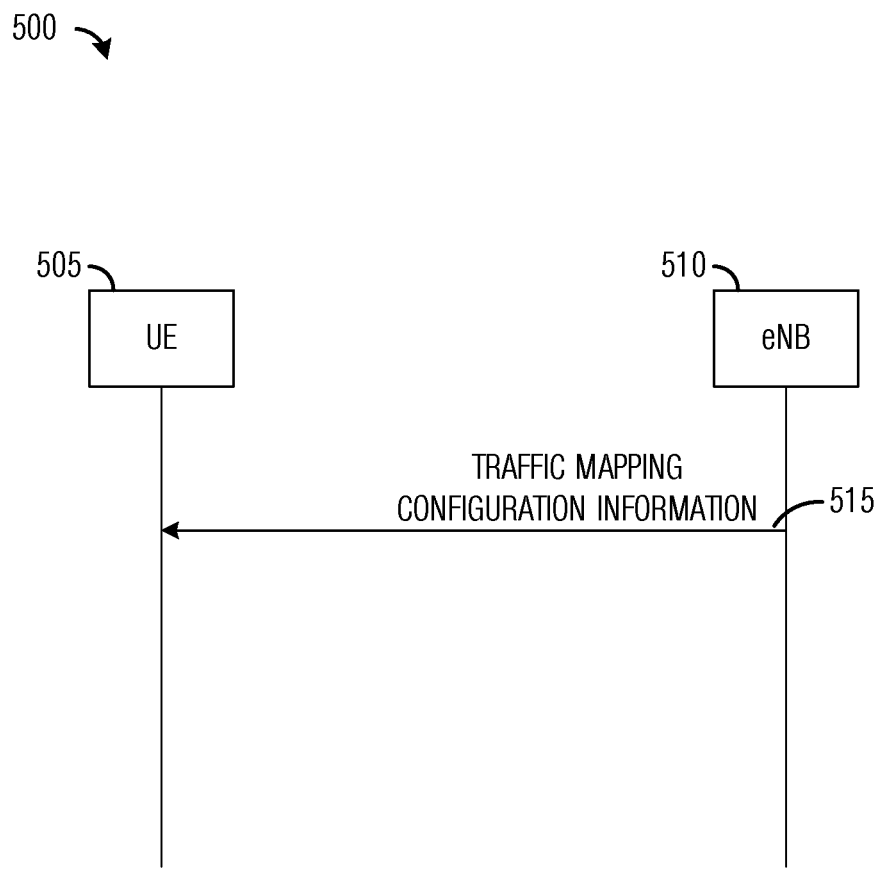
FIG. 5 illustrates an example message exchange diagram according to example embodiments described herein.

FIG. 5 illustrates an example message exchange diagram 500. Message exchange diagram 500 illustrates messages exchanged between a UE 505 and an eNB 510. As shown in FIG. 5, eNB 510 transmits updated traffic mapping configuration information to UE 505 (shown as event 515). The updated traffic mapping configuration information may be broadcast in a broadcast message or multicast in a multicast message.

It is noted that QoS requirement may be one example of how to characterize message traffic. Other ways to characterize message traffic may include data volume (or amount), user priority, application priority, latency sensitivity, and the like. Therefore, the discussion of the use of QoS requirement for characterizing message traffic should not be construed as being limiting to either the scope or the spirit of the example embodiments.

A UE may transition states. A UE may transition state for a variety of reasons, including (but not limited to) the execution of a new application on the UE, the ending of an existing application on the UE, and the like. A UE operating in the ECO state may transition to the ACTIVE state, and vice versa. As an example, a UE currently operating in the ECO state may transition to the ACTIVE state if it begins to execute a session based application (or an application that generates session based message traffic). Similarly, a UE currently operating in the ACTIVE state may transition to the ECO state if it no longer executes a session based application (or an application that generates session based message traffic).

Figure 6:
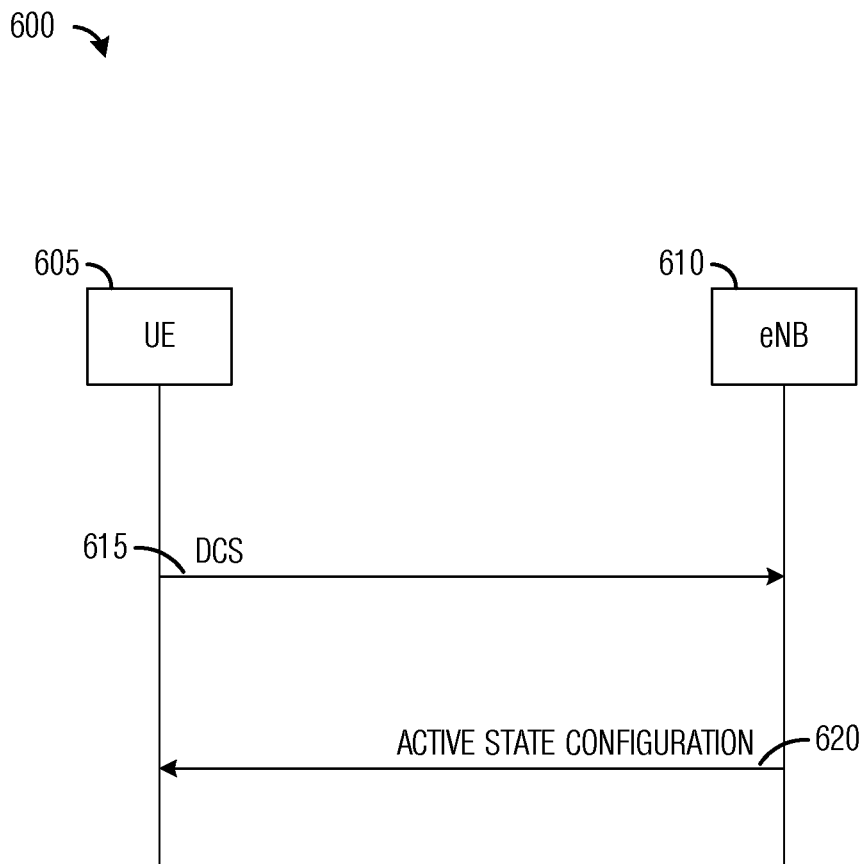
FIG. 6 illustrates an example message exchange diagram highlighting messages exchanged in a transition from an ECO state to an ACTIVE state according to example embodiments described herein.

FIG. 6 illustrates an example message exchange diagram 600 highlighting messages exchanged in a transition from an ECO state to an ACTIVE state. The state transition may be a contention-free access procedure, which allows for a simple and fast state transition, which may be referred to as a contention-free state transition. Message exchange diagram 600 illustrates messages exchanged between a UE 605 and an eNB 610 as UE 605 transitions from an ECO state to an ACTIVE state. UE 605 may initiate the state transition by transmitting a message including its DCS to eNB 610 (shown as event 615). eNB 610 may respond by transmitting active state configuration information to UE 605 (shown as event 620). The active state configuration information may include parameters such as power control information, timing advance information, and the like.

Figure 7A:
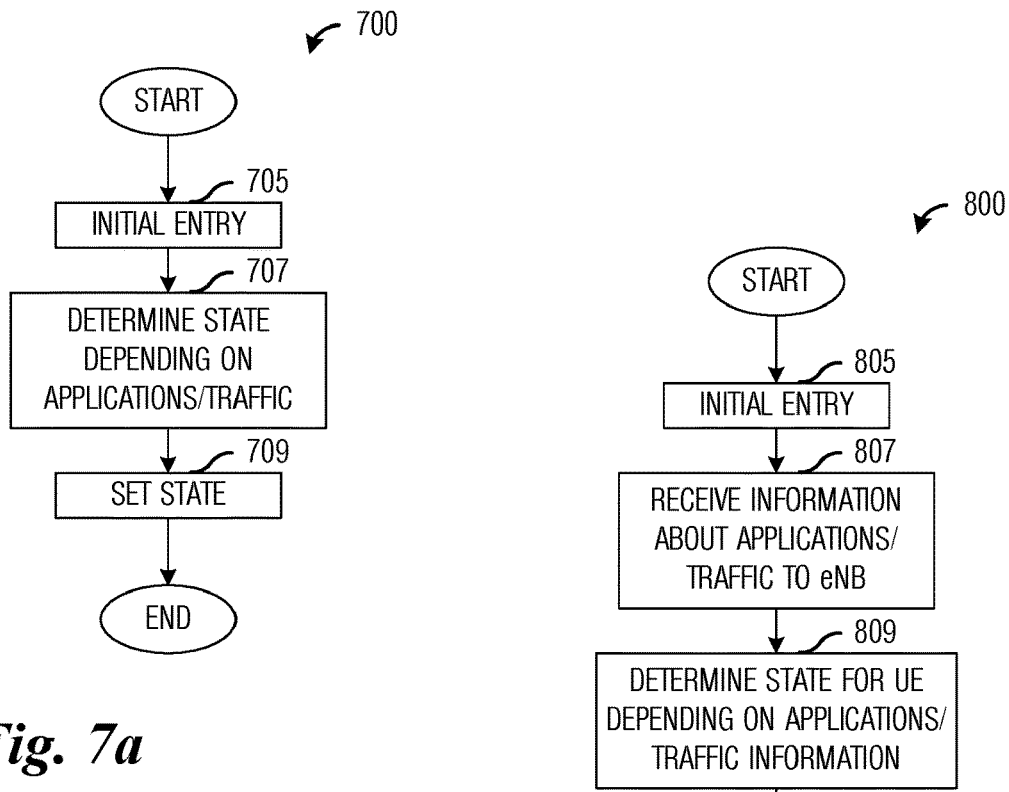
FIG. 7a illustrates a flow diagram of example operations occurring in a UE as the UE sets its state according to example embodiments described herein.

FIG. 7a illustrates a flow diagram of example operations 700 occurring in a UE as the UE sets its state. Operations 700 may be indicative of operations occurring in a UE, such as UEs 110-118, as the UE sets is state.

Operations 700 may begin with the UE performing initial entry with the eNB (block 705). As discussed previously, as part of initial entry or after initial entry, the UE may receive traffic mapping configuration information from the eNB. The UE may determine its state in accordance with the applications that it is running or the message traffic generated by the applications (block 707). As an example, the UE may utilize the example characterization of message traffic generated by applications shown in FIG. 4 to characterize the message traffic generated by the applications. A similar technique may be used by the UE to characterize the applications instead of the message traffic. The UE may set its operating state in accordance with the state determined in block 707 (block 709).

Figure 7B:
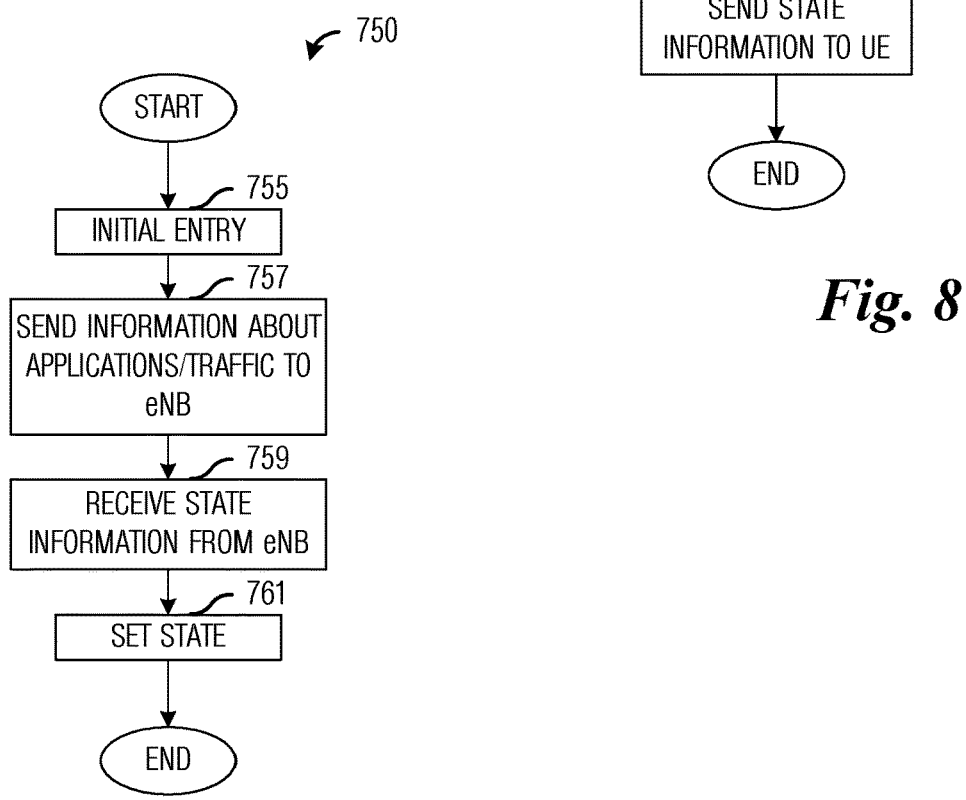
FIG. 7b illustrates a flow diagram of example operations occurring in a UE as the UE sets its state with state information received from an eNB according to example embodiments described herein.

FIG. 7b illustrates a flow diagram of example operations 750 occurring in a UE as the UE sets its state with state information received from an eNB. Operations 750 may be indicative of operations occurring in a UE, such as UEs 110-118, as the UE sets is state with state information received from an eNB.

Operations 750 may begin with the UE performing initial entry with the eNB (block 755). The UE may send information about applications that it is running or the message traffic generated by the applications to the eNB (block 757). Rather than characterizing its applications or the message traffic by itself, the UE may send the information about the applications or the message traffic to the eNB to have the eNB perform the characterization and determine the state for the UE. The UE may receive state information from the eNB (block 759). The state information may include an indicator of the operating state for the UE. The UE may set its operating state in accordance with the state information (block 761).

Figure 8:
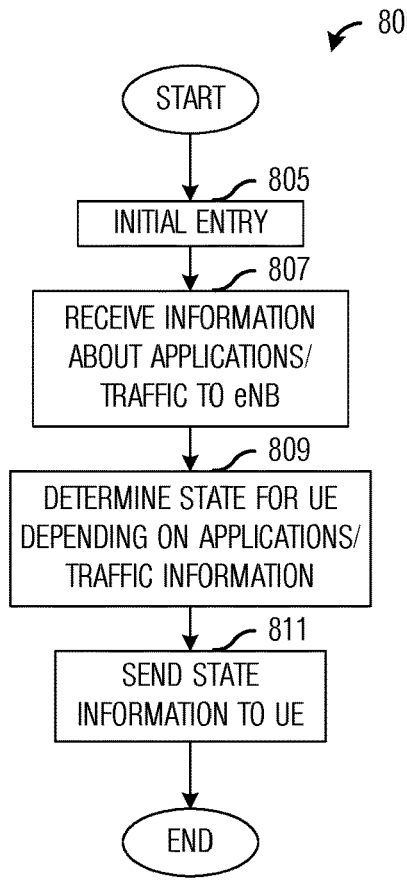
FIG. 8 illustrates a flow diagram of example operations occurring in an eNB as the eNB transmits state information to a UE according to example embodiments described herein.

FIG. 8 illustrates a flow diagram of example operations 750 occurring in an eNB as the eNB transmits state information to a UE. Operations 750 may be indicative of operations occurring in an eNB, such as eNB 105, as the eNB transmits state information to a UE.

Operations Boo may begin with the eNB performing initial entry with the UE (block 805). The eNB may receive information about applications that the UE is running or the message traffic generated by the applications (block 807). The eNB may determine an operating state for the UE in accordance with the information received from the UE (block 809). The eNB may utilize the example characterization of message traffic generated by applications shown in FIG. 4 to characterize the message traffic generated by the applications. The eNB may transmit information about the operating state (e.g., state information) to the UE (block 811).

Figures 9A, 9B:
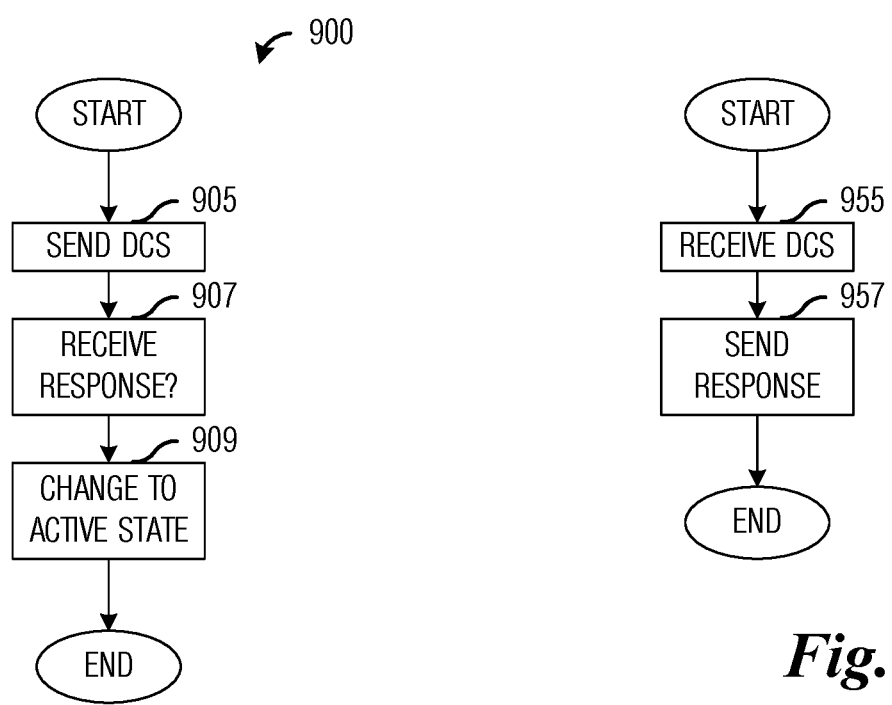
FIG. 9a illustrates a flow diagram of example operations occurring in a UE as the UE transitions from an ECO state to an ACTIVE state according to example embodiments described herein.
FIG. 9b illustrates a flow diagram of operations occurring in an eNB as the eNB helps a UE transition from an ECO state to an ACTIVE state according to example embodiments described herein.

FIG. 9*a* illustrates a flow diagram of example operations 900 occurring in a UE as the UE transitions from an ECO state to an ACTIVE state. Operations 900 may be indicative of operations occurring in a UE, such as UEs 110-118, as the UE transitions from the ECO state to the ACTIVE state, i.e., participates in a contention-free state transition.

Operations 900 may begin with the UE transmitting a message including a DCS to an eNB (block 905). As discussed previously, the DCS may be a unique value provided to the UE upon network entry. The UE may receive a response from the eNB (block 907). The response from the eNB may include parameters, such as power control information, timing advance information, and the like. The UE may change its state to the ACTIVE state (block 909).

FIG. 9*b* illustrates a flow diagram of operations 950 occurring in an eNB as the eNB helps a UE transition from an ECO state to an ACTIVE state. Operations 950 may be indicative of operations occurring in an eNB, such as eNB 105, as the eNB helps a UE transition from an ECO state to an ACTIVE state, i.e., participates in a contention-free state transition.

Operations 950 may begin with the eNB receiving a message including a DCS from the UE (block 955). Since the DCS is unique, the eNB may be able to identify the UE from its knowledge of the DCS. The eNB may transmit a response to the UE (block 957). The response from the eNB may include parameters, such as power control information, timing advance information, and the like.

Figures 10A, 10B:
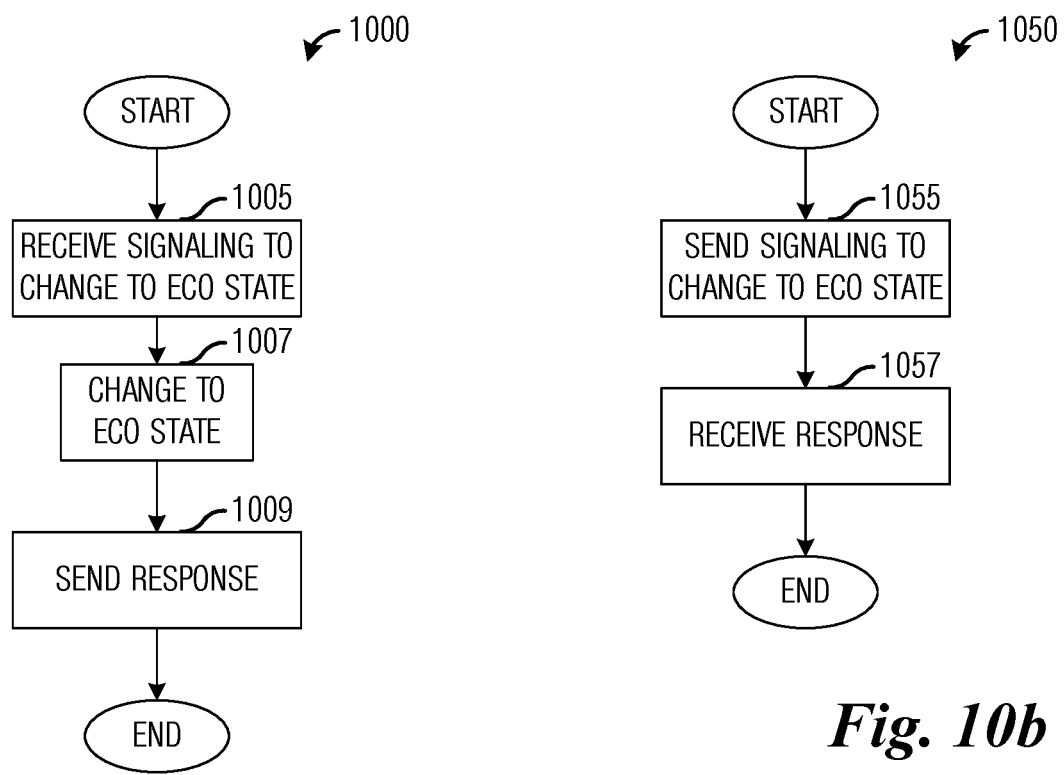
FIG. 10a illustrates a flow diagram of example operations occurring in a UE as the UE transitions from an ACTIVE state to an ECO state according to example embodiments described herein.
FIG. 10b illustrates a flow diagram of operations occurring in an eNB as the eNB helps a UE transition from an ACTIVE state to an ECO state according to example embodiments described herein.

FIG. 10*a* illustrates a flow diagram of example operations 1000 occurring in a UE as the UE transitions from an ACTIVE state to an ECO state. Operations 1000 may be indicative of operations occurring in a UE, such as UEs 110-118, as the UE transitions from the ACTIVE state to the ECO state.

Operations 1000 may begin with the UE receiving signaling to change to the ECO state (block 1005). In general, the transition from the ACTIVE state to the ECO state is initiated by the eNB. The UE may change its state to the ECO state (block 1007). The UE may send a response to the eNB indicating that it has transitioned to the ECO state or will transition to the ECO state (block 1009).

FIG. 10*b* illustrates a flow diagram of operations 1050 occurring in an eNB as the eNB helps a UE transition from an ACTIVE state to an ECO state. Operations 1050 may be indicative of operations occurring in an eNB, such as eNB 105, as the eNB helps a UE transition from an ACTIVE state to an ECO state.

Operations 1050 may begin with the eNB transmitting signaling to the UE informing the UE to transition to the ECO state (block 1055). Since the transition from the ACTIVE state to the ECO state is initiated by the eNB, the eNB sends the signaling to the UE. The eNB may receive a response from the UE indicating that it has transitioned to the ECO state or will transition to the ECO state (block 1057).

Figure 11:
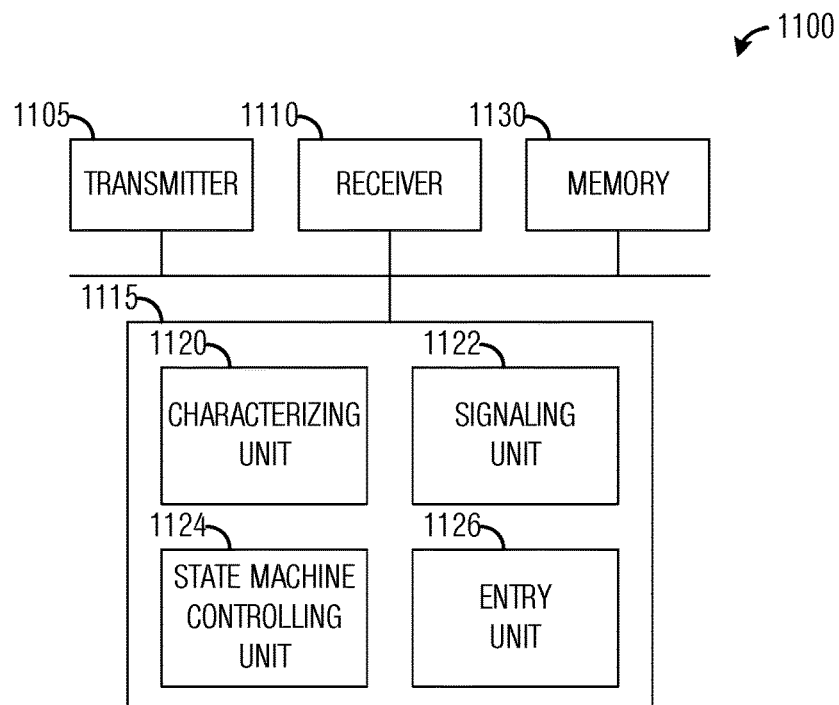
FIG. 11 illustrates an example first communications device according to example embodiments described herein.

FIG. 11 illustrates an example first communications device 1100. Communications device 1100 may be an implementation of a station, a user equipment, a terminal, a subscriber, a mobile station, and the like. Communications device 1100 may be used to implement various ones of the embodiments discussed herein. As shown in FIG. 11, a transmitter 1105 is configured to transmit packets, and the like. Communications device 1100 also includes a receiver 1110 that is configured to receive packets, state information, traffic mapping configuration information, and the like.

A characterizing unit 1120 is configured to characterize an application based on message traffic generated by the application. Characterizing unit 1120 is configured to characterize message traffic generated by an application. A signaling unit 1122 is configured to generate message for transmission. A state machine controlling unit 1124 is configured to control a state of a state machine. State machine controlling unit 1124 is configured to transition the state machine from a first state to a second state. State machine controlling unit 1124 is configured to transition the state machine in accordance with traffic mapping configuration information, state information, and the like. State machine controlling unit 1124 is configured to implement a state machine with an ACTIVE state and an ECO state, such as shown in FIG. 2. An entry unit 1126 is configured to perform a network entry procedure with an eNB. A memory 1130 is configured to store states, state information, characterizations of applications, characterizations of message traffic, traffic mapping configuration information and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while characterizing unit 1120, signaling unit 1122, state machine controlling unit 1124, and entry unit 1126 may be software modules executing in a microprocessor (such as processor 1115) or a custom circuit or a custom compiled logic array of a field programmable logic array. Characterizing unit 1120, signaling unit 1122, state machine controlling unit 1124, and entry unit 1126 may be modules stored in memory 1130.

Figure 12:
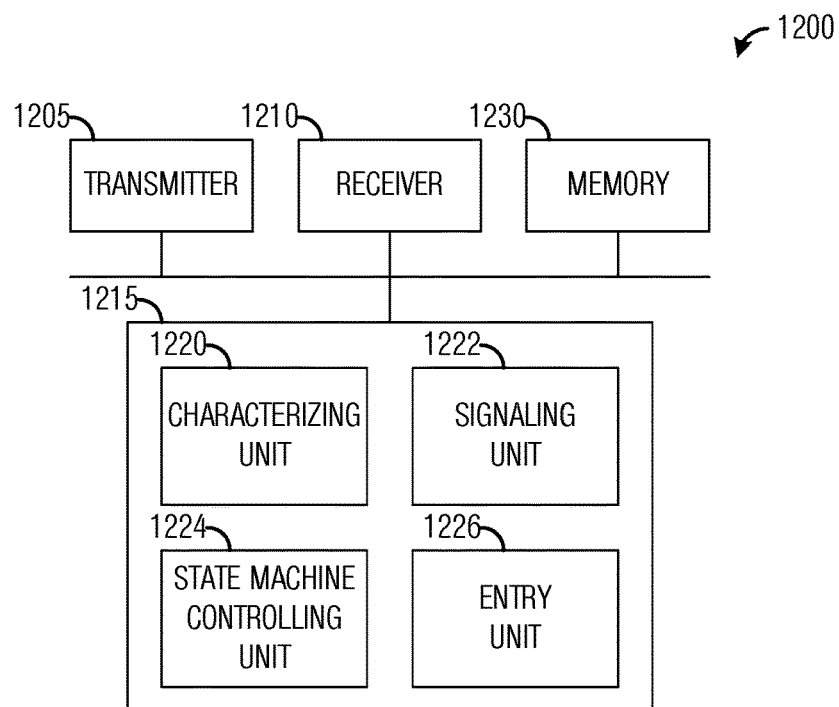
FIG. 12 illustrates an example second communications device according to example embodiments described herein.

FIG. 12 illustrates an example second communications device 1200. Communications device 1200 may be an implementation of an AP, a base station, a NodeB, an eNB, a controller, a communications controller, and the like. Communications device 1200 may be used to implement various ones of the embodiments discussed herein. As shown in FIG. 12, a transmitter 1205 is configured to transmit packets, state information, traffic mapping configuration information, and the like. Communications device 1200 also includes a receiver 1210 that is configured to receive packets, and the like.

A characterizing unit 1220 is configured to characterize an application based on message traffic generated by the application. Characterizing unit 1220 is configured to characterize message traffic generated by an application. Characterizing unit 1220 is configured to characterize applications and/or message traffic for UE connected to communications device 1200. A signaling unit 1222 is configured to generate message for transmission. A state machine controlling unit 1224 is configured to generate state information to control a state of a state machine. State machine controlling unit 1224 is configured to generate state information to transition the state machine from a first state to a second state. State machine controlling unit 1224 is configured to generate state information to transition the state machine in accordance with traffic mapping configuration information, state information, and the like. An entry unit 1226 is configured to perform a network entry procedure with a UE. A memory 1230 is configured to store states, state information, characterizations of applications, characterizations of message traffic, traffic mapping configuration information and the like.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, receiver 1210 and transmitter 1205 may be implemented as a specific hardware block, while characterizing unit 1220, signaling unit 1222, state machine controlling unit 1224, and entry unit 1226 may be software modules executing in a microprocessor (such as processor 1215) or a custom circuit or a custom compiled logic array of a field programmable logic array. Characterizing unit 1220, signaling unit 1222, state machine controlling unit 1224, and entry unit 1226 may be modules stored in memory 1230.

Although the present disclosure and its advantages have been described in detail, it should be understood that various changes, substitutions and alterations can be made herein without departing from the spirit and scope of the disclosure as defined by the appended claims.

What is claimed is:

1. A method comprising:
    receiving, by a user equipment (UE) from a communication device, a UE identifier (ID) uniquely identifying the UE that is in a first state being different from an active state and an idle state, the first state allowing maintenance of the UE ID for data transmission and reception of the UE that is in the first state, the first state supporting a data transfer connectivity without dynamic resource allocation request and grant from the communication device, wherein the UE ID received from the communication device is associated with a dedicated connection signature (DCS) obtained by the UE upon initial network entry, and wherein the DCS is for a state transition of the UE from the first state to the active state; and
    communicating by the UE that is in the first state with the communication device in a network, using the UE ID.

2. The method according to claim 1, the data transfer connectivity including the data transmission and reception.

3. The method according to claim 1, further comprising:
    obtaining, by the UE, the DCS upon the initial network entry, the DCS being unique to the UE;
    transitioning, by the UE, from the first state to the active state;
    transmitting, by the UE in the first state, a message indicating a transition from the first state to the active state for the UE, the message comprising the DCS of the UE; and
    communicating, by the UE that is in the active state, with the communication device using the UE ID.

4. The method according to claim 1, the UE ID being a combination of a UE-centric ID and other information.

5. The method according to claim 4, the UE-centric ID being a MAC ID of the UE and the other information being associated with a network resource ID of a network resource assigned to the UE.

6. The method according to claim 5, the network resource ID indicating a time frequency resource.

7. The method according to claim 6, the network resource ID including a time resource ID and a frequency resource ID.

8. The method according to claim 1, further comprising:
    obtaining, by the UE, the DCS upon the initial network entry, the DCS being unique to the UE;
    transmitting, by the UE in the first state, a message requesting a transition from the first state to the active state for the UE, the message comprising the DCS;
    transitioning, by the UE, from the first state to the active state upon receiving a response from the communication device; and
    communicating, by the UE that is in the active state, with the communication device using the UE ID.

9. An apparatus comprising at least one processor coupled with a memory, wherein when the apparatus is in a first state being different from an active state and an idle state, wherein the first state allows maintenance of an identifier (ID) for data transmission and reception of the apparatus that is in the first state, the at least one processor is configured to:
    receive, by the apparatus in the first state from a communication device, the ID uniquely identifying the apparatus, the first state supporting a data transfer connectivity without dynamic resource allocation request and grant from the communication device, wherein the ID received from the communication device is associated with a dedicated connection signature (DCS) obtained by the apparatus upon initial network entry, and wherein the DCS is for a state transition of the apparatus from the first state to the active state; and
    communicate, by the apparatus in the first state, with the communication device in a network using the ID.

10. The apparatus according to claim 9, the data transfer connectivity including the data transmission and reception.

11. The apparatus according to claim 9, the processor being further configured to:
    obtain the DCS, the DCS being unique to the apparatus;
    transition from the first state to the active state;
    transmit by the apparatus in the first state, a message indicating a transition from the first state to the active state for the apparatus, the message comprising the DCS of the apparatus; and
    communicate, by the apparatus that is in the active state, with the communication device using the ID.

12. The apparatus according to claim 9, the ID being a combination of an apparatus-centric ID and other information.

13. The apparatus according to claim 12, the apparatus-centric ID being a MAC ID of the apparatus and the other information being associated with a network resource ID of a network resource assigned to the apparatus.

14. The apparatus according to claim 13, the network resource ID indicating a time frequency resource.

15. The apparatus according to claim 14, the network resource ID including a time resource ID and a frequency resource ID.

16. The apparatus according to claim 9, the processor being further configured to:
    obtain the DCS, the DCS being unique to the apparatus;
    transmit, by the apparatus in the first state, a message requesting a transition from the first state to the active state for the apparatus, the message comprising the DCS;

transition from the first state to the active state upon receiving a response from the communication device; and communicate, by the apparatus that is in the active state, with the communication device using the ID.

17. A non-transitory computer-readable medium having instructions stored thereon that, when executed by an apparatus, cause the apparatus to perform operations, the operations comprising:

receiving, from a communication device, an identifier (ID) uniquely identifying the apparatus that is in a first state being different from an active state and an idle state, wherein the first state allows maintenance of the ID for data transmission and reception of the apparatus that is in the first state, the first state supporting a data transfer connectivity without dynamic resource allocation request and grant from the communication device, wherein the ID received from the communication device is associated with a dedicated connection signature (DCS) obtained by the apparatus upon initial network entry, and wherein the DCS is for a state transition of the apparatus from the first state to the active state; and communicating, when the apparatus operating in the first state, with the communication device in a network, using the ID.

* * * * *